(12) United States Patent
Ponnath (10) Patent No.: US 8,656,468 B2
(45) Date of Patent: Feb. 18, 2014

(54) METHOD AND SYSTEM FOR VALIDATING AUTHENTICITY OF IDENTITY CLAIMS

(75) Inventor: Maneesh Ponnath, Bangalore (IN)

(73) Assignee: Infosys Limited (IN)

( * ) Notice: Subject to any disclaimer, the term of this patent is extended or adjusted under 35 U.S.C. 154(b) by 432 days.

(21) Appl. No.: 12/814,726

(22) Filed: Jun. 14, 2010

(65) Prior Publication Data

US 2011/0099617 A1   Apr. 28, 2011

(30) Foreign Application Priority Data

Oct. 23, 2009   (IN) ............................ 2559/CHE/2009

(51) Int. Cl.
*G06F 7/04* (2006.01)

(52) U.S. Cl.
USPC ..................................... 726/7; 726/6; 726/10

(58) Field of Classification Search
USPC .......................................................... 726/6, 7
See application file for complete search history.

(56) References Cited

U.S. PATENT DOCUMENTS

| | | | | |
|---|---|---|---|---|
| 7,562,222 | B2* | 7/2009 | Gasparini et al. | 713/170 |
| 8,135,385 | B2* | 3/2012 | Ohta et al. | 455/411 |
| 2006/0293972 | A1* | 12/2006 | Aoki et al. | 705/26 |
| 2008/0060082 | A1* | 3/2008 | Matthews et al. | 726/27 |
| 2010/0100950 | A1* | 4/2010 | Roberts | 726/7 |

* cited by examiner

*Primary Examiner* — Amare F Tabor
*Assistant Examiner* — Abiy Getachew
(74) *Attorney, Agent, or Firm* — Lerner, David, Littenberg, Krumholz & Mentlik, LLP (57) ABSTRACT

A method for validating authenticity of identity claims of one or more communicating entities in an online transaction over a network is disclosed. The method includes extracting identity information of the first communicating entity by the second communicating entity during online transaction and prompting a client to provide a unique resource name of the first entity. Further, the method includes validating the identity information extracted from the first entity by checking identity information already registered in a registry. Later the method includes authenticating the identity claims of the first entity based on the validation results. The method also includes steps for registering identity information of the first entity within the registry.

38 Claims, 6 Drawing Sheets

METHOD AND SYSTEM FOR VALIDATING AUTHENTICITY OF IDENTITY CLAIMS

BACKGROUND OF THE INVENTION

The present invention generally relates to security, and particularly, to a method and system for verifying the authenticity of identity claims of entities engaged in an online transaction over a network.

In the current business trend, enterprises typically use Internet to provide online transaction facilities either to their customers or vendors or partners to stay competitive in the emerging market. These online transaction facilities may include an online banking service or an online trading service or any other related services. Generally, the online transaction may include one or more entities interacting or communicating with each other, which are unknown to each other. The communicating entities may exchange sensitive data during the online transaction. Thus, reliance on Internet to carry out sensitive and critical transactions is ever increasing and there is a greater need for building a trust relationship between the communicating entities during online transaction.

Typically, to build trust relationship between communicating entities (henceforth the interacting entities are also be referred as a client and/or a server), the server should verify the authenticity of the client and the client should, in turn, verify the authenticity of the server. After this verification process, the client may initiate the online transaction. However, this is not followed in practice. The server is generally capable of verifying the authenticity of the clients, by means of validating the client credentials. The credentials may include any of a clientname, a password, a digital certificate, and so forth. However, the client is generally not capable of verifying the authenticity of the server.

Technical solutions like digital certificates may provide a way to uniquely identify the interacting entities. The server may well have its own digital certificate. However, the failure on the part of the client to verify the authenticity of the server is not because of lack of technical solutions that are used to uniquely identify the server but because the client may be not capable of verifying the authenticity of the server by virtue of not being knowledgeable enough about the technical solutions. This broadens the gap between the server and the client while trying to build the trust relationship during the online transaction and makes the whole setup vulnerable to attacks.

Hackers have exploited this fundamental flaw in establishment of trust relationship and have created exploits that are commonly known as phishing attacks. Phishing attacks are generally aimed at stealing sensitive information of the client, which includes at least one of client credentials, social security number or credit card details, using social engineering techniques by masquerading as a trustworthy business entity, via electronic channels like the Internet. It relies on the ignorance on the part of the client while interacting with the server.

There exist measures to address such security attacks. Few of them include: a) using filters in an Internet browser and Domain Name Servers (DNS) to prevent the client from connecting to known malicious servers (web applications etc), b) Internet browsers prompting the client to verify the identify claims made by the server applications, thus allowing the client to accept or reject the identity claim based on the client knowledge, c) usage of fingerprint impression of the client at the time of registration with the servers to verify the authenticity of the server (web application) by means of a finger print (usually an image) which was set by the client at the time of registration, and d) disabling scripts in e-mail clients to prevent accidental access by the client to malicious web sites embedded within.

However, all of the above techniques mentioned above are associated with a few fundamental problems. The filters used in the Internet browser and the DNS may filter out only known malicious servers. If a new malicious site is created, the existing filters may not be able to block the server. The Internet browsers prompting the client to verify the identify claims solely depend on the judgment of the client. Since most of the clients are not aware of the technical complexities involved in identity claims, relying on the knowledge of the client is prone to failure. Using finger prints also fails against a man-in-the-middle (MITM) attack. The method of disabling scripts in an e-mail client may reduce the client visits to malicious sites but doesn't help the client in verifying the authenticity of the identity claims.

The aforementioned solutions are aimed at providing symptomatic cures by trying to prevent the client from connecting to a malicious entity. But in spite of these, if the client connects to a malicious system, such solutions may not offer further assistance.

Thus, there is a need for a reliable method and system for building trust relationship between the communicating entities by verifying the authenticity of identity claims of the communicating entities in an online transaction over a network. A client should be able to identify whether the server (web site and etc.) with which they are interacting through a client application during an online transaction is indeed the right server.

BRIEF SUMMARY OF THE INVENTION

A method for validating authenticity of identity claims of one or more communicating entities in an online transaction over a network is disclosed. Also, a method for registering identity information of a plurality of entities in a registry is disclosed. Such methods may help in establishing trust relationship between the communicating entities during online transaction, which are generally unknown to each others. Also, the methods help in reducing phishing attacks, which have posed serious challenges to clients and service providers.

In one embodiment of the present technique, a computer implemented method for validating authenticity of identity claims of communicating entities includes the step of initiating communication with a first entity during an online transaction by a second entity. The first entity may be server and the second entity may be a client device. The method further includes extracting identity information of the first entity during the initiated communication with the first entity and prompting the second entity to provide a unique resource name corresponding to the first entity, by a client agent. The client agent may be a part of the client device, using which the client is communicating with the server.

In one embodiment of the present technique, the client agent may later validate the identity information of the first entity extracted from the server. The validation step may include the step of comparing the identity information of the first entity with the corresponding registered identity information stored within a registry for the unique resource name provided by the second entity.

In another embodiment of the present technique, the registry may validate the identity information of the first entity extracted from the server. The validation step may include the step of comparing the identity information of the first entity with the corresponding registered identity information stored within the registry for the unique resource name provided by the second entity.

Finally, the client agent may determine the authenticity of the identity claims of the first entity, initiated during the communication with the second entity based on the validation results.

In one embodiment of the present technique, a computer implemented method for registering identity information of a plurality of entities in a registry includes the step of receiving identity information of the plurality of entities from a network based resource. The plurality of entities includes the first entity, which is a server. The method further includes determining inconsistency of the identity claims by comparing the received identity information with registered identity information in the registry. Finally, the method includes registering the identity information of the first entity within the registry by associating the identity information with a corresponding unique resource name. Additionally, the method may include the step of resolving the inconsistency of the identity information by performing at least one of eliminating duplicate identity information and resolving identity information naming conflicts.

In one embodiment of the present technique, the network may be a secure network using a secured transport layer protocol.

BRIEF DESCRIPTION OF THE DRAWINGS

The above mentioned features as well other features, aspects, and advantages of the present invention will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention, which is known to the inventors at the time of filing the patent application. Of course, many modifications and adaptations will be apparent to those skilled in the relevant arts in view of the following description, in view of the accompanying drawings and the appended claims. While the system and method described herein are provided with a certain degree of specificity, the present technique may be implemented with either greater or lesser specificity, depending on the needs of the client. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present invention relates to a method and system for verifying authenticity of identity claims of one or more communicating entities in an online transaction over a network. The method and system also details an approach for registering one or more identity information of a plurality of entities in a registry. The inventive technique to be detailed in the subsequent sections to follow also explains numerous variations to implement the inventive steps of the present technique in terms of one or more embodiments.

The following description is presented to enable a person of ordinary skill in the art to make and use the invention and is provided in the context of the requirement for obtaining a patent. The present description is the best presently contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

Figure 1:
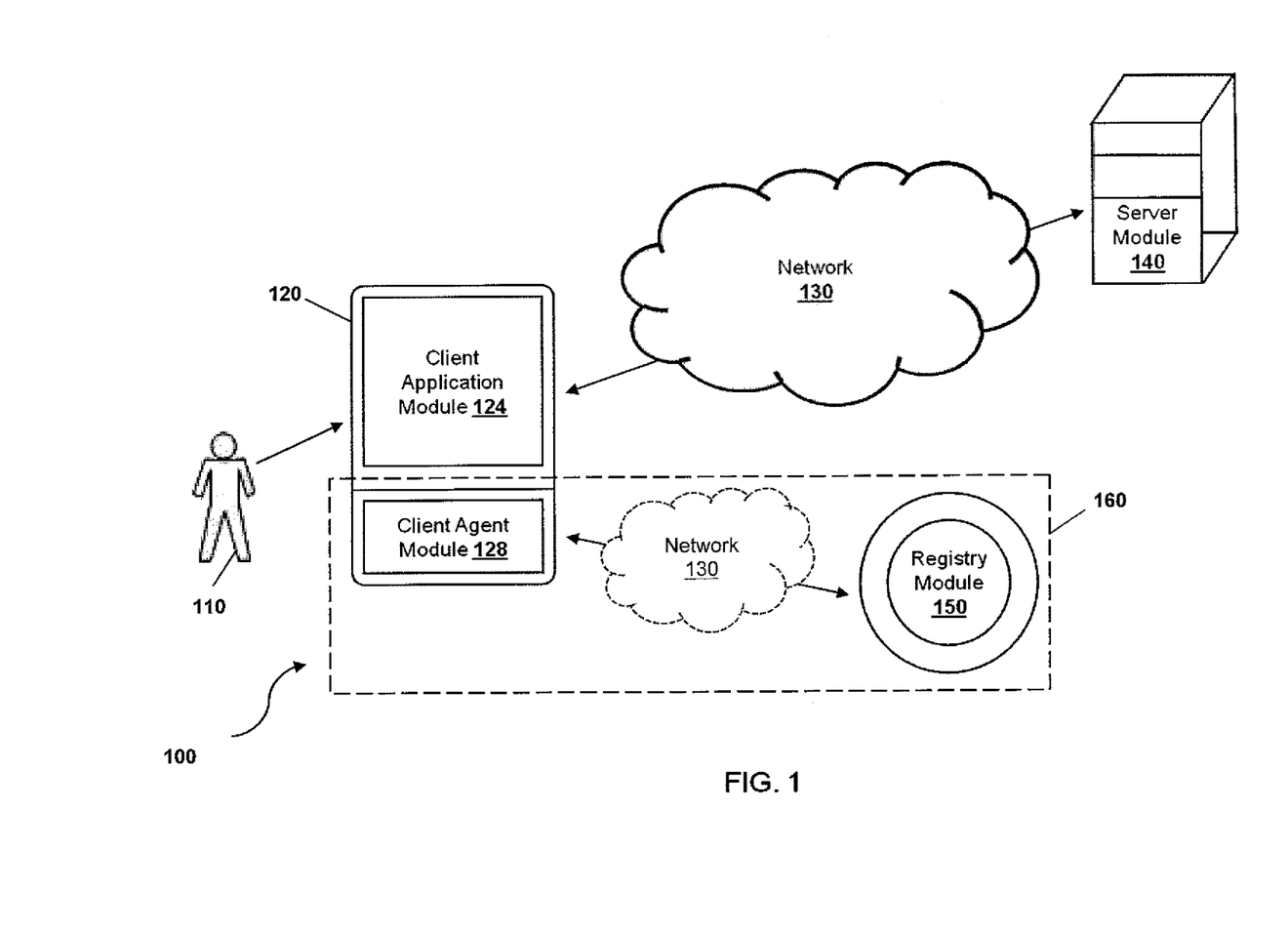
FIG. 1 is a block diagram illustrating one or more communicating entities interacting over a network during online transaction, according to one embodiment of the present technique.

Referring to the figures, FIG. 1 is a block diagram of a system 100 illustrating one or more communicating entities interacting over a network 130 during online transaction, according to one embodiment of the present technique. In one embodiment of the present technique, the communicating entities include at least a first entity and second entity. The first entity is a server module 140 and the second entity is a client device 120 (herein also referred to as "client application").

In one embodiment of the present technique, the system 100 includes at least the client device 120 and the server module 140 communicating over the network 130. The client device 120 is accessed by a client 110. The system 100 further includes a registry module 150, which may be an offline application, which the client device 120 may access through at least one of a USB port, a serial port, a parallel port and a swipe-in port as represented by dotted line 160 according to one embodiment of the present technique. Also, the registry module 150 may be an online application, which the client device 120 may access through at least one of an Internet-based application and an Intranet-based application over the network 130 as per another embodiment of the present technique.

In one embodiment of the present technique, the client 110 initiates communication with the server module 140 using the client application 120 during an online transaction over the network 130. The client application 120 interacts with the registry module 150 to determine the authenticity of the server module 140 the client application 120 is communicating during online transaction.

In one embodiment of the present technique, the client application or client device 120 may be at least one of a mobile phone, a desktop computer, a laptop, and a personal digital assistant (PDA). The client device 120 includes at least one of a client application module 124 and a client agent module 128. The client device 120 may include other accessories or components, which are omitted or not mentioned herein for clarity purpose to detail the present technique. The scope of the client device 120 should not be restricted in light of the number of components detailed as per the present technique.

In one embodiment of the present technique, the client application module 124 may be an Internet browser application, which may be accessed by the client 110 to communicate with the server module 140 during the online transaction. The client 110 may initiate communication with the server module 140, using the Internet browser application through numerous other ways including inputting a server module's 140 domain name, clicking on the hyperlinked advertisement address of the server module 140 and through e-mail providing link to access the server module 140. The example illustrated above is not intended to limit the scope of application of the present technique. The client agent module 128 is an intelligent agent, which can intercept the communication initiated by the client 110. The client agent module 128 is further capable of intercepting the communication received from the communicated server module 140 before presenting it to the client 110 through the Internet browser application. The client agent module 128 is configured within a client device 120 to communicate with the server module 140.

In one embodiment of the present technique, the network 130 through which the client 110 communicates with the server module 140 is a secure network that uses a secured transport layer protocol for communication between the entities. The network 130 may also be any other secure network known in the art. The scope of the present technique should not be restrictive in light of network 130 being used for communicating between the entities.

In one embodiment of the present technique, the server module 140 includes at least one of a web server, a web application and a remote procedure. The server module 140 is capable of hosting one or more application, which may be either for providing an information purpose or for conducting a business transaction purpose. For example, the server module 140 of a bulletin company may host news for providing information about the latest happenings in the world. Also, the server module 140 of a bank may host an electronic banking application, which may allow the client 110 to conduct online business transaction with the bank. The server module 140 is a unit capable of being accessed through a network for any purpose by the client 110. The scope of the sever module 140 should not be restrictive in light of above examples.

The system 100 additionally includes the registry module 150, which as per one embodiment of the present technique is a smart card which may be plugged in or swiped in the client device 120. The smart card may be even made accessible to the client device 120 through any of a USB port, a serial port and parallel port. In another embodiment of the present technique, the registry module 150 is at least one of a web application and a web service. Accordingly, the registry device 150 may be made accessible to the client device 120 through the network 130.

The registry module 150 of the present technique stores a digital certificate of the plurality of the server module 140. The registry module 150 may obtain the plurality of digital certificates of the server module 150 through at least one of an online registration process and an offline registration process. In one embodiment of the present technique, the online registration process is by accessing the web application and the offline registration process is by accessing a smart device installed typically like an automated teller machine (ATM) for registration purpose.

The dotted line 160 around the registry module 150 indicates that the registry module 150 may be either configured as a web application or service or smart card as per one or more embodiments of the present technique.

In one embodiment of the present technique, the client 110 does inputting activity in the client device 120 to access the sever module 140. The inputting activity may include typing the web address of the server module 140, they wanted to access. The client device 120 on receiving inputs from the client 110 communicates with the server module 140. The server module 140 replies to the client device 120 with validity claims of the server module 140, which is intercepted by the client agent module 128 to determine the authenticity of the sever module 140. The client agent module 128 determines the authenticity of the validity claims of the server module 140 the client 110 is trying to access after validating with the registry module 150. On successful validation of the authenticity of the validity claims of the server module 140, the client 110 may be allowed to further communicate with the server module 140.

Figure 2:
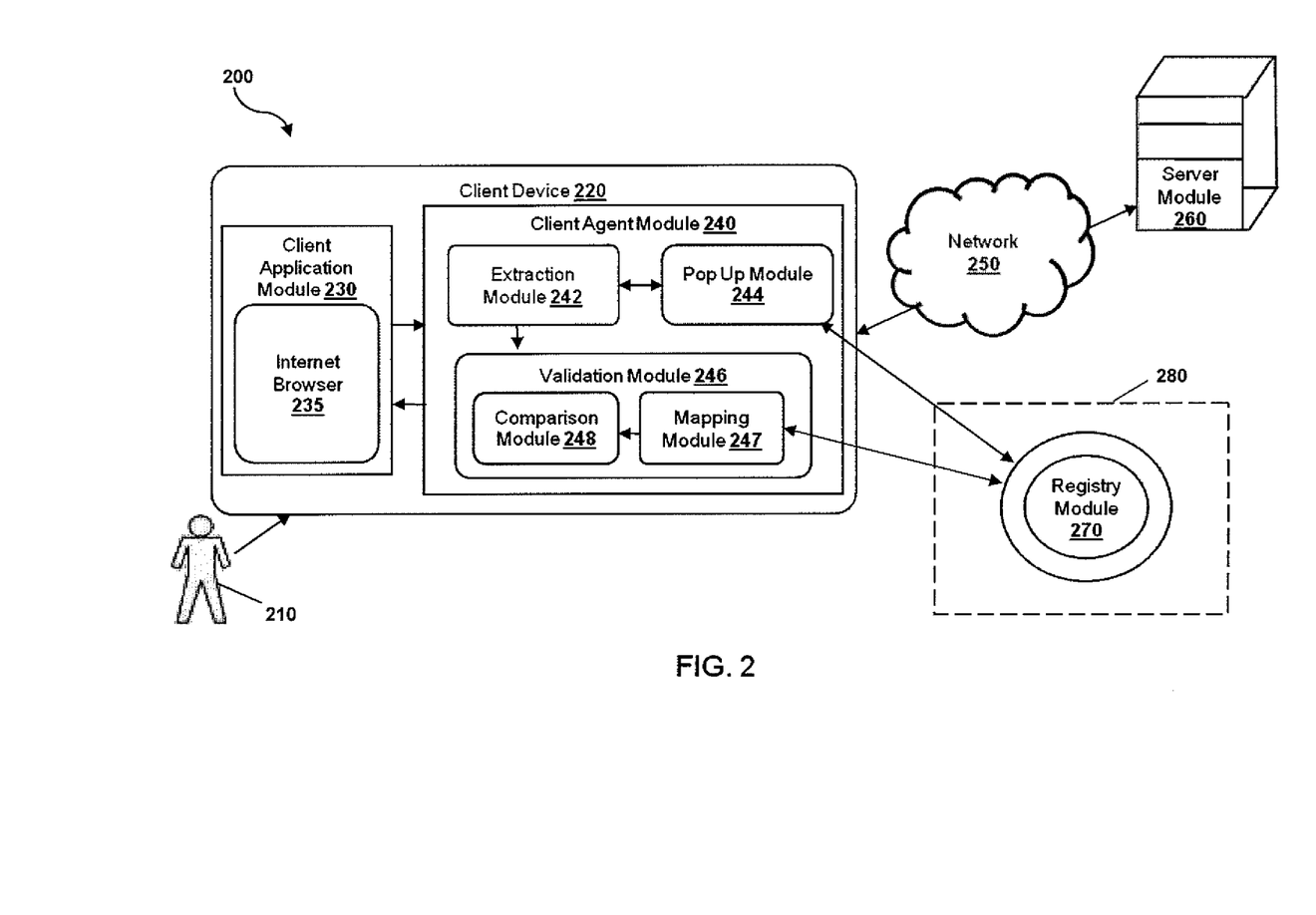
FIG. 2 is a block diagram illustrating a client device interacting with a server module over a network during online transaction, according to one embodiment of the present technique.

Referring to the figures, FIG. 2 is a block diagram of a system 200 illustrating a client device 220 interacting with a server module 260 over a network 250 during online transaction, according to one embodiment of the present technique.

In one embodiment of the present technique, the system 200 includes at least the client device 220, server module 260 and a registry module 270. The system 200 additionally comprises a client 210 and a network 250 to enable communication between the client device 220 and the server module 260.

In one embodiment of the present technique, the client device 220 includes at least one of a client application module 230 and the client agent module 240. The client application module 230 allows the client 210 to initiate communication with the server module 260 by provide the input of a server module domain name they want to communicate. The client application module 230 includes an Internet browser 235 for initiating communicating with the server module 260 over the network 250 as per one embodiment of the present technique. The client agent module 240 includes at least one of an extraction module 242, a pop-up module 244 and a validation module 246. The client agent module 240 may intercept the communication initiated by the client 110 as well the communication received back from the server module 260.

In one embodiment of the present technique upon initiation of the communication from the Internet browser 235, the server module 260 replies to the client device 220 over the network 250 with identity information of the server module 260. The identity information of the server module 260 may include a digital certificate of the server module 260. In one embodiment of the present technique, the server module 260 includes at least one of web server, a web application and a remote procedure. The network 250 is a secure network using a secured transport layer protocol for communication between the entities.

In one embodiment of the present technique, the client agent module 240 intercepts the reply sent from the server module 260. The extraction module 242 of the client agent module 240 extracts the digital certificate of the server module 260. After extraction of the identity information from the server module 260 by the extraction module 242, the pop-up module 244 prompts the client 210 for providing a unique resource name of the server module 260 they are trying to communicate with. In one embodiment of the present technique, the unique resource name includes at least one of a domain name and an alias name. The extraction module 242 later passes the digital certificate extracted from the server module 260 and the domain name or the alias name of the server module 260 as provided by the client 210 to the validation module 246 for validation purpose of the authenticity claims of the server module 260.

According to another embodiment of the present technique, the pop-up module 244 may additionally obtain a list of unique resource name (herein also referred as "domain names" or "alias name") of the plurality of the servers and may list them to the client 210 to select the appropriate one they are trying to communicate with. The pop-up module 244 may obtain the list of unique resource name from the registry module 270. The registry module 270 may be at least one of a smart card or web application. The list may contain only one unique resource name of the server, if the registry module 270 has only one identity information stored. If the registry module 270 stores multiple identity information of multiple servers then the unique resource name of the multiple server modules 270 will figure in the list.

In one embodiment of the present technique, the validation module 246 validates the identity claims of the server module 260. The validation module 246 includes at least one of a mapping module 247 and a comparison module 248. The mapping module 247 requests a registry module 270 to fetch already registered identity information of the server module 260 based on the unique resource name of the server module 260 as provided by the mapping module 247. The registry module 270 in turn retrieves the registered identity information from the repository by comparing unique resource name as provided by the mapping module 247 and the unique resource name recorded to the registered identity information during registration of the identity information. The retrieved identity information is passed to the mapping module 247. The mapping module 247 then passes the fetched registered module from the registry module 270 to the comparison module 248. The comparison module 246 compares the extracted identity information received from the extraction module 242 with the fetched identity information received from the registry module 270.

In one embodiment of the present technique, the registry module 270 further includes notifying the mapping module 247 about the unique resource name (provided by the mapping module 247) not being recorded for any of the registered identity information stored in the repository of the registry module 270.

In one embodiment of the present technique, the comparison module 278 of the client agent module 240 denies the client device 220 from continuing the initiated communication with the server module 260 when the identity information of the server module 260 is not found registered within the registry module 270. In another embodiment of the present technique, the comparison module 278 of the client agent module 240 denies the client device 220 from continuing the initiated communication with the server module 260 when the extracted identity information does not match the fetched registered identity information retrieved from the registry module 270.

In another embodiment of the present technique the comparison module 278 of the client agent module 240 allows the client device 220 to continue the initiated communication with the server module 260 when the extracted identity information of the server module 260 is found registered within the registry module 270. In yet another embodiment of the present technique, the comparison module 278 of the client agent module 240 allows the client device 220 from continuing the initiated communication with the server module 260 when the extracted identity information matches with the fetched registered identity information retrieved from the registry module 270.

In yet another embodiment of the present technique, the comparison module 278 of the client agent module 240 notifies the client device 220 about a malicious resource based on the validation results. The malicious resource is the server module 260, which the client device 220 is trying to communicate.

In one embodiment of the present technique, the client device 220 informs the client 210 through the Internet browser 235 of the client application module 230.

In one embodiment of the present technique, the registry module 270 may be at least one of a smart card and a web application or service. The dotted line 280 indicates that the registry module 270 is an independent component which may be accessed by the client device 220 through an offline application and an online application through a network (not shown). In one embodiment of the present technique, the registry module 270 is a smart card and the client device 220 has a provision for accessing the smart card. The provision may be at least one of a USB port, a serial port, a parallel port and a swipe-in port. In another embodiment, the registry module 270 being the online application, the client device 220 may access the registry module 270 by at least one of an Internet-based application and an Intranet-based application. The Internet-based application or Intranet-based application may be a web application or a web service, which the client device 220 may access through the network 250. The network 250 is a secure network using a secure transport layer protocol.

Figure 3:
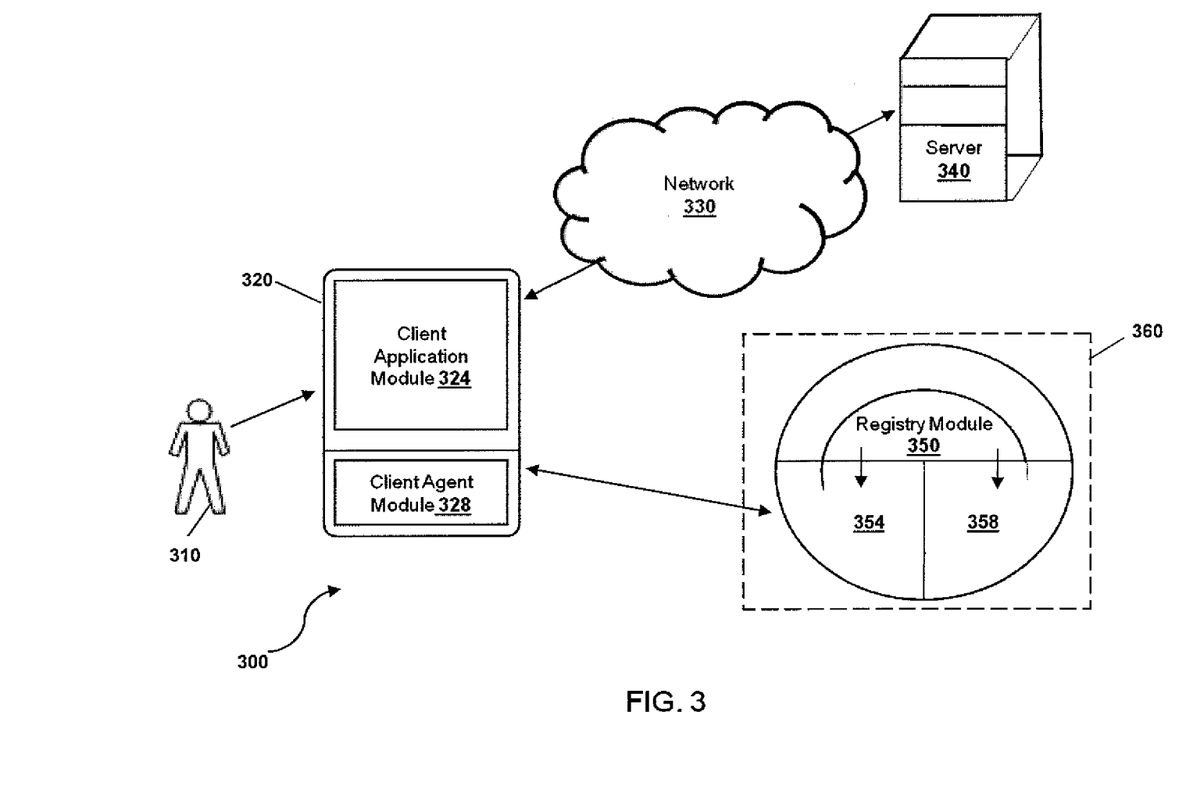
FIG. 3 is a block diagram illustrating a client device interacting with a server module over a network during online transaction, according to another embodiment of the present technique.

Referring to the figures, FIG. 3 is a block diagram of a system 300 illustrating a client device 320 interacting with a server module 340 over a network 330 during an online transaction, according to another embodiment of the present technique.

In another embodiment of the present technique, the system 300 includes at least one of the client device 320, a server module 340 and a registry module 350. The system 300 additionally comprises a client 310 and a network 330 to enable communication between the client device 320 and the server module 340.

In another embodiment of the present technique, the client device 320 includes at least one of a client application module 324 and the client agent module 328. The client application module 324 allows the client 310 to initiate communication with the server module 340 by inputting at least a server module domain name they want to communicate with. The client agent module 328 may intercept the communication initiated by the client 310 as well the communication received from the server module 340.

In another embodiment of the present technique, upon initiation of the communication from the client application module 324, the server module 340 replies back to the client device 320 over the network 330 with identity information of the server module 340. The identity information of the server module 340 may include a digital certificate of the server module 340. In another embodiment of the present technique, the server module 340 includes at least one of web server, a web application and a remote procedure. The network 330 is a secure network using a secured transport layer protocol for communication between the entities.

In another embodiment of the present technique, the client agent module 328 intercepts the reply sent from the server module 340 during online transaction and extracts the digital certificate of the server module 340. After extraction of the identity information from the server module 340 the client agent module 328 prompts the client 310 to provide a unique resource name of the server module 340. The client agent module 328 may additionally obtain a list of unique resource names of the plurality of servers and may display the list to the client 310 for selection. The client agent module 328 may obtain the list of unique resource names from the registry module 350. The list may contain only one unique resource name of the server if the registry module 350 has only one identity information stored. If the registry module 350 stores multiple identity information of multiple servers, the unique resource names of the multiple servers will figure in the list. In another embodiment of the present technique, the unique resource name includes at least one of a domain name and an alias name. Further, the client agent module 328 transfers the extracted identity information and the unique resource name obtained from the client 310 to a registry mapping module 354 of the registry module 350 for validation.

In another embodiment of the present technique the registry mapping module 354 fetch already registered identity information of the server module 340, from the registry module 350, based on the unique resource name of the server module 340 as provided by the client agent module 328. Further, the registry mapping module 354 transfers at least one of the extracted identity information obtained from the client agent module 328 and the registered identity information obtained from the registry module 350 to a registry comparison module 358 for validation of the identity claims of the server module 340. The registry comparison module 358 does the comparison between the extracted identity information received from the registered mapping module 354 with the fetched identity information received from the registry module 350.

In another embodiment of the present technique, the registry module 350 further includes intimating the registry mapping module 354 about the unique resource name (provided by the client agent module 328) not being recorded for any of the registered identity information stored in the repository of the registry module 350.

In another embodiment of the present technique, the registry comparison module 358 of the registry module 350 denies the client agent module 328 from continuing the initiated communication with the server module 340 when the extracted identity information of the server module 340 is not found registered within the registry module 350. In yet another embodiment of the present technique, the registry comparison module 358 of the registry module 350 denies the client agent module 328 from continuing the initiated communication with the server module 340 when the extracted identity information, which it received from the client agent module 328, does not match with the fetched registered identity information, which it retrieved from the registry mapping module 354.

In another embodiment of the present technique the registry comparison module 358 of the registry module 350 allows the client agent module 328 to continue the initiated communication with the server module 340 when the extracted identity information of the server module 340 is found registered within the registry module 270. In yet another embodiment of the present technique, the registry comparison module 358 of the registry module 350 allows the client agent module 328 from continuing the initiated communication with the server module 340 when the extracted identity information, which it received from the client agent module 328, matches with the fetched registered identity information, which it retrieved from the registry mapping module 354.

In yet another embodiment of the present technique, the registry comparison module 358 of the registry module 350 notifies the client agent module 328 about a malicious resource based on the validation results. The malicious resource is the server module 340, which the client device 320 is trying to communicate with.

In another embodiment of the present technique, the client agent module 328 informs the client 310 through the client device 320 about the validation results.

In another embodiment of the present technique, the registry module 350 may be at least one of a smart card and a web application or web service. The dotted line 360 indicates the registry module 350 is an independent component which may be accessed by the client device 320 through at least one of an offline application and an online application through network (not shown). In yet another embodiment of the present technique, the registry module 350 being the offline application, the client device 320 may have a provision for accessing the offline application. The provision may be at least one of a USB port, a serial port, a parallel port and a swipe in port. In yet another embodiment the registry module 350 being the online application, the client device 320 may access the registry module 350 by at least one of an Internet-based application and an Intranet-based application. The Internet-based application or Intranet-based application may be a web application or a web service, which the client device 320 may access through the network 330. The network 330 is the secure network using a secure transport layer protocol.

Figure 4:
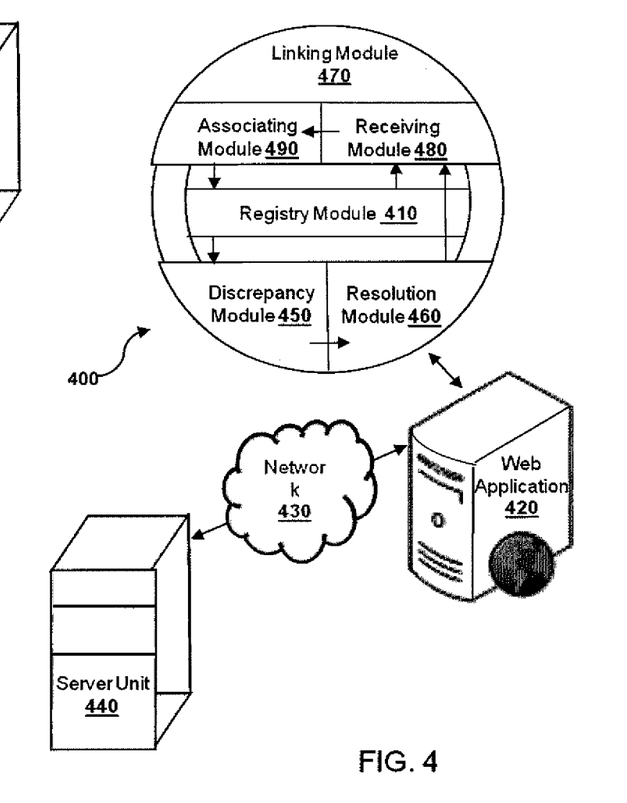
FIG. 4 is a block diagram illustrating a registry module interacting with a server unit during registration of one or more identity information of a first entity, according to one embodiment of the present technique.

Referring to the figures, FIG. 4 is a block diagram of a system 400 illustrating a registry module 410 interacting with a server unit 440 during registration of one or more identity information of a first entity, according to one embodiment of the present technique.

In one embodiment of the present technique, the first entity includes a plurality of server modules, whose identity information is to be registered in the registry module 410. In one embodiment of the present technique, the server unit 440 may be a server module, whose identity information is to be registered in the registration module. In such case registration of the identity information of the server module needs to be accomplished independently by interacting with the plurality of such server unit 440. In another embodiment of the present technique, the server unit 440 is a disparate server module comprising a list of all server modules' identity information stored in it. In this case, registration of the identity information of plurality of the server modules may be accomplished by collaboratively interacting with single server unit 440.

In one embodiment of the present technique, the system 400 comprises the registry module 410, a web application 420 and a server unit 440. The registry module 410 interacts with the server unit 430 through a network 430.

In one embodiment of the present technique, the server unit 440 interacts with the registry module 410 through a network based resource for registrations of the identity information of the plurality of sever modules. The network based resource in one embodiment of the present technique is at least one of an Internet-based application, an Intranet-based application, and an offline-based application.

In one embodiment of the present technique, the registry module 410 is further configured for registering the identity information through at least one of an online registration process and an offline registration process. The online registration process uses at least one of the Internet-based application and the Intranet-based application. The offline registration process uses a smart card based application.

The Internet-based application or Intranet-based application may be a web application or a web service. As per one embodiment of the present technique, the web application 420 based online registration process is depicted in FIG. 4.

A client (not shown) may initiate the registration of identity information in the registry module 410 by interacting with the server module 440 through the web application 420. In another embodiment of the present technique, the server module 440 may periodically update the identity information in the registry module 410. During interacting with the server unit 440 by the registry module 410, the server unit 440 may send the identity information of the plurality of server modules to the registry module 410 through the web application 420 over the network 430.

In one embodiment of the present technique, the registry module 410 includes at least one of a discrepancy module 450, a resolution module 460 and a linking module 470. The discrepancy module 450 is configured for checking inconsistency in the identity information of the server module, which the registry module 410 received from the server unit 440. The discrepancy in the received identity information is determined by comparing the received identity information with already registered identity information in the registry module 410. The resolution module 460 is configured for resolving the inconsistency in the received identity information that is determined by the discrepancy module 450. In one embodiment of the present technique, resolution of the inconsistency in the received identity information is achieved by eliminating at least one of duplicate identity information and the identity information naming conflicts.

In one embodiment of the present technique, resolution of the identity information naming conflicts includes checking for latest identity information of the sever module and registering those in the registry module 410. Further, resolution of the duplicate identity information includes at least one of deleting old entry of the identity information and updating the old entry of the identity information with the received identity information.

In one embodiment of the present technique, the linking module 470 is used to associate a unique resource name with the received identity information from the registry module 410 and register the identity information in the registry module 410. The linking module 470 is further configured for receiving the unique resource name from at least one of server unit 440 for the plurality of server module and the client (not shown) before associating the unique resource name with the identity information.

The linking module 470 includes at least one of a receiving module 480 and an associating module 490. The receiving module 480 receives the unique resource name from at least one of server unit 440 and the client for the plurality of server module. In another embodiment of the present technique, the receiving module 480 of the registry module 410 may additionally comprise a list of all unique resource names of the server modules. The client may select the unique resource name from the list displayed by the receiving module 480. The unique resource name may be at least one of a server module domain name and an alias name of the server module. The associating module 490 may later associate the unique resource name with the identity information. Further, the associating module 490 registers the identity information associated with the unique resource name with in the registry module 410.

In one embodiment of the present technique, the registration step is preceded by a step of resolving the inconsistency step by performing at least one of eliminating duplicate identity information and resolving identity information naming conflicts.

Figure 5:
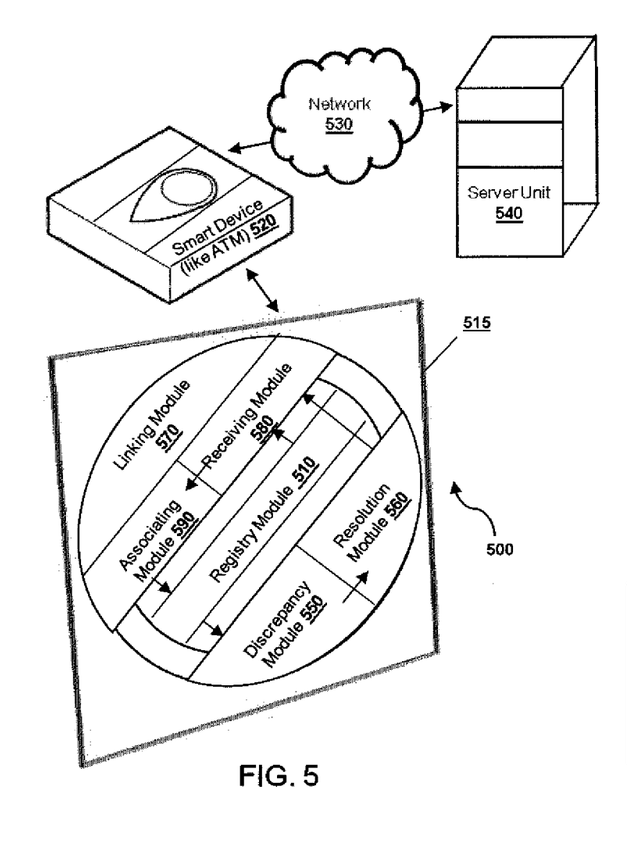
FIG. 5 is a block diagram illustrating a registry module interacting with a smart device during registration of one or more identity information of a first entity, according to another embodiment of the present technique.

Referring to the figures, FIG. 5 is a block diagram of a system 500 illustrating a registry module 510 interacting with a smart device 520 during registration of one or more identity information of a first entity, according to another embodiment of the present technique.

In another embodiment of the present technique, the first entity includes a plurality of server modules, whose identity information is to be registered in the registry module 510. In another embodiment of the present technique, the registry module 510 is a smart card 515. The smart card 515 may be plugged in or swiped in a smart device 520 for registration of the identity information of the plurality of server modules. In another embodiment of the present technique, the smart card 515 may additionally be connected to the smart device 520 through at least one of a USB port, a serial port and parallel port. In another embodiment of the present technique, the smart device 520 may be a typical ATM like setup used for registration purpose. The offline-based application may smart device 520 installed typically like an ATM for registration purpose. As per another embodiment of the present technique, the smart device 520 based offline registration process is depicted in FIG. 5.

A client (not shown) may initiate the registration of identity information in the smart card 515 by interacting with the smart device 520. The server unit 540 in turn may interact with the smart device 520 over a network 530 for registration of identity information. The server unit 540 may send the identity information of the plurality of server modules to the registry module 510 of the smart card 515 through the smart device 520 over the network 530. After receiving of the identity information from the server module 530 the smart device 520 may write or register the identity information in the registry module 510.

In another embodiment of the present technique, the server unit 540 may be a server module, whose identity information is to be registered in the registration module 510 of the smart card 515. In this case, registration of the identity information of the server module needs to be accomplished independently by interacting with the plurality of such server unit 540. In yet another embodiment of the present technique, the server unit 540 is a disparate server module comprising a list of all server modules' identity information stored in it. In such case registration of the identity information of plurality of the server modules may be accomplished by collaboratively interacting with single server unit 540.

In one embodiment of the present technique, the registry module 510 includes at least one of a discrepancy module 550, a resolution module 560 and a linking module 570. The discrepancy module 550 is configured for checking inconsistency in the identity information received from the smart device 520, which the smart device 520 received from the server unit 540. The discrepancy in the received identity information is determined by comparing the received identity information with already registered identity information in the registry module 510. The resolution module 560 is configured for resolving the inconsistency in the received identity information that is determined by the discrepancy module 550. In one embodiment of the present technique, resolution of the inconsistency in the received identity information is achieved by eliminating at least one of duplicate identity information and the identity information naming conflicts. The linking module 570 is used to associate a unique resource name with the received identity information from the registry module 510 and register the identity information in the registry module 510. The linking module 570 includes at least one of a receiving module 580 and an associating module 590. The receiving module 580 receives the unique resource name from at least one of smart device 520 for the plurality of server module and the client. The receiving module 580 of the registry module 510 may additionally comprise a list of all unique resource names of the server modules. The client may select the unique resource name from the list displayed by the receiving module 580. The unique resource name may be at least one of a server module domain name and an alias name of the server module. The associating module 590 may later associate the unique resource name with the identity information. Further, the associating module 590 registers the identity information associated with the unique resource name within the registry module 510.

In another embodiment of the present technique, the registration step is preceded by a step of resolving the inconsistency step by performing at least one of eliminating duplicate identity information and resolving identity information naming conflicts.

Figure 6:
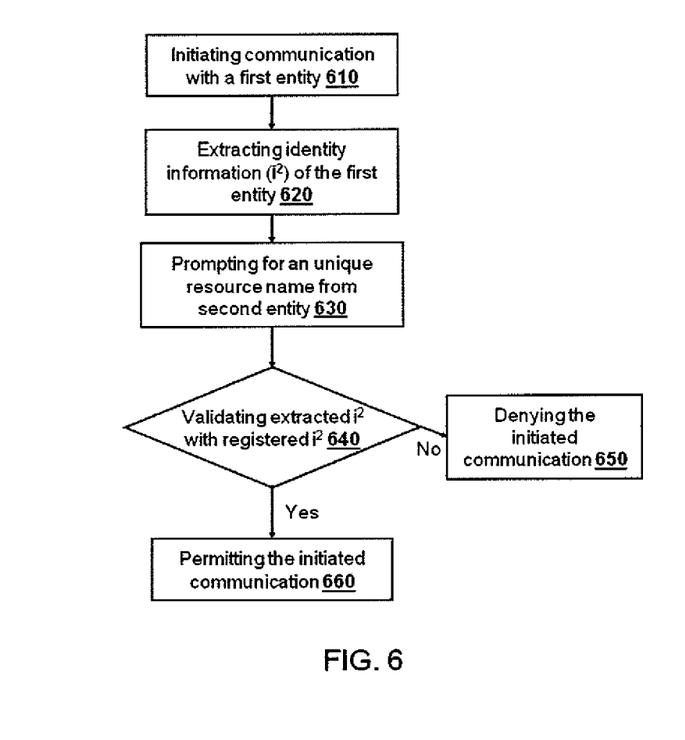
FIG. 6 is a flow diagram depicting a method of verifying authenticity of identity claims of one or more communicating entities in an online transaction over a network, according to one embodiment of the present technique.

Referring to the figures, FIG. 6 is a flow diagram depicting a method of verifying authenticity of identity claims of one or more communicating entities in an online transaction over a network, according to one embodiment of the present technique.

In one embodiment of the present technique, the method comprises: 1) initiating communication with a first entity (block 610), 2) extracting identity information (herein also referred as "i2") of the first entity (block 620), 3) prompting for a unique resource name from second entity (block 630), 4) validating extracted i2 with registered i2 (block 640), 5) denying the initiated communication (block 650), and 6) permitting the initiated communication (block 660). Each of the steps will be explained in greater extent in the subsequent sections.

The method of verifying authenticity of identity claims of one or more communicating entities in an online transaction over a network may begin with a step of initiating communication with the first entity as represented by step 610. In step 610, the second entity is a client device, which may be used by a client to initiate the communication with the first entity through the network. The first entity may be a server, which the client is trying to access, through his client device. On initiating the communication with the server, the server responds back with identity information to the client device. The client device includes a client agent, which intercepts the communication sent from the server and extracts the identity information from the server, as represented in step 620. The identity information may be a digital certificate of the server.

In step 630, the client agent prompts the client to input a unique resource name of the server that they have initiated the communication. The client agent may alternatively provide a list of unique resource names of all servers and may ask the client to select one unique resource name from the list. The client agent may obtain the list of unique resource name from the registry. The registry may be at least one of a smart card or web application. The list may contain only one unique resource name of the server, if the registry has only one identity information stored. If the registry stores multiple identity information of multiple servers then the unique resource name of the multiple servers will figure in the list. The unique resource name may be the domain name of the server the client is trying to communicate. Alternatively, it may be an alias name of the server the client is trying to communicate. On receiving input about the unique resource name from the client, the client device may validate the extracted identity information from the server with registered identity information in a registry.

In one embodiment of the present technique, in step 640, the client agent may provide the unique resource name as inputted by the client to the registry and seek for the registered identity information from the registry. The registry may, in turn, check the registry for the registry identity information associated to the unique resource name as provided by the client agent. The registry respond back to the client agent with the registered identity information, if the same is found associated with the unique resource name. Alternatively, the registry may respond back to the client agent with the registered identity information, which is associated to the unique resource name, being not found.

The client agent on receiving the registered identity information from the registry may check the extracted identity information with the registered identity information. If the client agent does not get the registered identity information from the registry it may deny the client to further continue with the initiated communication through the client device, as represented in step 650. Alternatively, the client agent may prompt the client that the resource or the server with which they have initiated communication is a malicious resource or not the correct server or the server's identity information is not registered in the registry module. In case the registered identity information is not registered, the client may be provided an option to register the identity information of the server within the registry module before further continuing with the initiated communication. If the client agent during validation of the registered identity information with the registered identity information determines that both are matching, then the client agent permits the client to continue with the initiated communication through the client device, as represented in step 660.

In another embodiment of the present technique, in step 650, the client agent may provide the unique resource name as inputted by the client and the extracted identity information to the registry so that the registry may validate the extracted identity information with registered identity information. The registry on receiving the extracted identity information and the unique resource name from the client agent may check the registry for the registered identity information, which is associated with the same unique resource name as provided by the client agent. On successful retrieval of the registered identity information which is associated with the same unique resource name as provided by the client agent, the registered identity information is validated with the extracted identity information received from the client agent. If the registry is not able to retrieve the registered identity information, which is associated with the unique resource name as provided by the client agent, the registry will respond back to the client agent with unsuccessful validation of the identity information or identity information being not registered. On such unsuccessful validation of the identity information the registry may deny the client to continue with the initiated communication with the server, as represented in step 650. Alternatively, the registry may prompt the client that the server with which they have initiated communication is a malicious resource or is not the correct server. On informing the client agent about the identity information being not registered, the registry may prompt the client through the client device with an option to register the extracted identity information in the registry. If the registry is able to retrieve the registry identity information, which is associated with the unique resource name as provided by the client agent, the registry is conduct the validation of the extracted identity information with the registered identity information. If the registered identity information matches with the extracted identity information, the registry module may allow the client to continue with the initiated communication with the server, as represented in step 660. If the extracted identity information does not match with the registered identity information, the registry may deny the client to continue with the initiated communication with the server, through the client device, as represented in step 650. Alternatively, the registry may prompt the client that the resource or the server with which they have initiated communication is a malicious resource or not the correct server they are trying to access.

In one embodiment of the present technique, the first entity is at least one of a web server, a web application and a remote procedure. The second entity is at least one of a client device and a client application. The network using which the second entity is initiated communication with the first entity is a secure network that uses a secured transport layer protocol. Further, the second entity may initiate communication with the first entity using an internet browser, an advertising link, an e-mail link, and a discussion forum link.

In one embodiment of the present technique, the client agent continuously checks the identity claims of the server, which the client is trying to initiate, communicate with. The client may have initiated the further communication either by clicking on the hyperlink provided within the web page of the server they have already communicating with or by inputting the new domain name of the server they want to communicate within the same Internet browser. In one embodiment of the present technique, if the client reinitiates the communication with the same server before logging out, the client agent may not validate the authenticity of the identity claims of the same server again.

Figure 7:
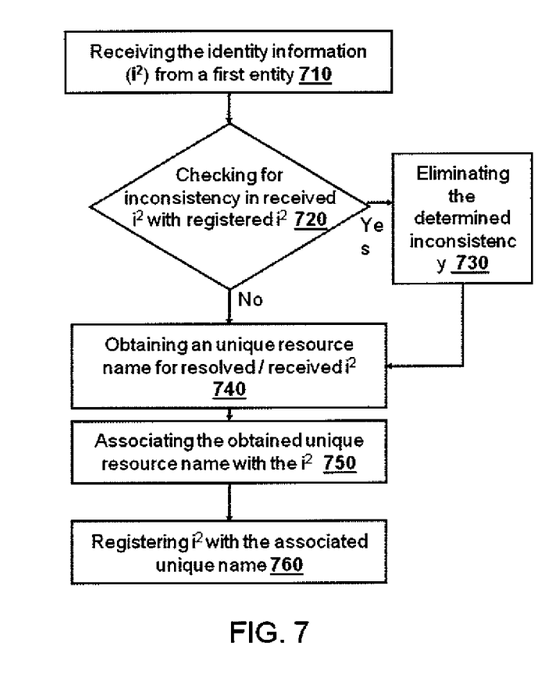
FIG. 7 is a flow diagram depicting a method of registering identity information of a plurality of entities in a registry, according to one embodiment of the present technique.

Referring to the figures, FIG. 7 is a flow diagram depicting a method of registering identity information of a plurality of entities in a registry, according to one embodiment of the present technique.

In one embodiment of the present technique, the method comprising: 1) receiving the identity information (i2) from a first entity (block 710), 2) checking for inconsistency in received i2 with registered i2 (block 720), 3) eliminating the determined inconsistency (block 730), 4) obtaining an unique resource name for resolved/received i2 (block 740), 5) associating the obtained unique resource name with the i2 (block 750), and 6) registering i2 with the associated unique resource name (block 760). Each of the steps will be explained in greater extent in the subsequent sections to follow.

The method of registering identity information of one or more communicating entities in an online transaction over a network may begin with a step of receiving identity information of the first entity as represented by step 710. In one embodiment of the present technique, the first entity is at least one of a server. The second entity is at least one of a client device and a client application. In step 710, a client may use a network based resource for registering the plurality of server's identity information in a registry module. The network based resource may include any one of an Internet-based application, an Intranet-based application, and an offline-based application.

In one embodiment of the present technique, the Internet-based application or the Intranet-based application may be a web server for registration purpose. In one embodiment of the present technique, the web server may be a server, whose identity information is to be registered within the registry. In another embodiment of the present technique, the web server may include a list of all servers' identity information, which is to be registered within the registry.

In one embodiment of the present technique, the offline-based application may be a smart device for registration purpose. In one embodiment of the present technique, the smart device may be configured for accessing the web server for registration of the identity information of the servers within the registry.

In one embodiment of the present technique, the registry module may be at least one of a smart card, and a web application.

The one embodiment of the present technique, in step 710, the registry receives the identity information of the plurality of servers from the web server. On receiving the identity information of the servers the registry module check for inconsistency in the identity information received from the server. The step of checking for inconsistency may include comparing the identity information received with the identity information registered in the registry. The step of checking inconsistency may include at least one of identifying duplicate identity information and identity information naming conflicts. Alternatively, the step of checking for inconsistency may even result in finding out no inconsistency.

If there is any inconsistency in terms of the duplicate identity information and the identity information naming conflicts, the resolution step may be performed, as represented by step 730. At step 730, the inconsistency in the identity information is resolved by performing at least one of eliminating duplicate identity information and resolving identity information naming conflicts. The step 730 is optional, and is performed only if, in the previous step, any inconsistency is determined.

Although the invention herein has been described In step 740, the registry is configured for obtaining a unique resource name for the resolved or received identity information from the client. The client may input the unique resource name of the server for the identity information. The registry may additionally provide a list of the unique resource name for the client to input one unique resource name form the list. The unique resource name may be a domain name of the server or an alias name of the server. Additionally, the registry may provide the unique resource name for the identity information of the server and may seek for confirmation from the client on the same.

In step 750, the registry associates the inputted resource name with the identity information of the server. This step is important for retrieving the identity information based on the unique resource name later in the process of authenticating the identity claims of the server during online transaction.

In step 760, after associating the unique resource name to the identity information the registry module registers and stores the identity information in a repository of the registry.

In one embodiment of the present technique, the main advantage includes reducing the existed gap in the trust relationship between the communicating entities during online transaction. The present technique allows the clients who are not capable of validating the authenticity of the server to easily conduct online transaction without a fear of data security. Also, the phishing attacks, which have posed serious challenges to clients and service providers alike, can be reduced.

This present technique helps the client identify whether the server (web site etc) they are connected to is indeed the one they intended to communicate with. Even if the client is connected to a malicious resource or server, the present technique validates the authenticity of the identity claim made by the malicious server. Using the present technique, the client may terminate the communication even before the client initiates any transaction or sends any sensitive data to the malicious resource.

This invention is aimed at addressing the above mentioned gap in establishment of trust between interacting parties. It is about a system and a method that can substitute for the lack of knowledge of the end client and help this entity successfully verify the authenticity of the system it interacts with, thereby successfully establishing the trust relationship between the interacting parties.

Exemplary Computing Environment

Figure 8:
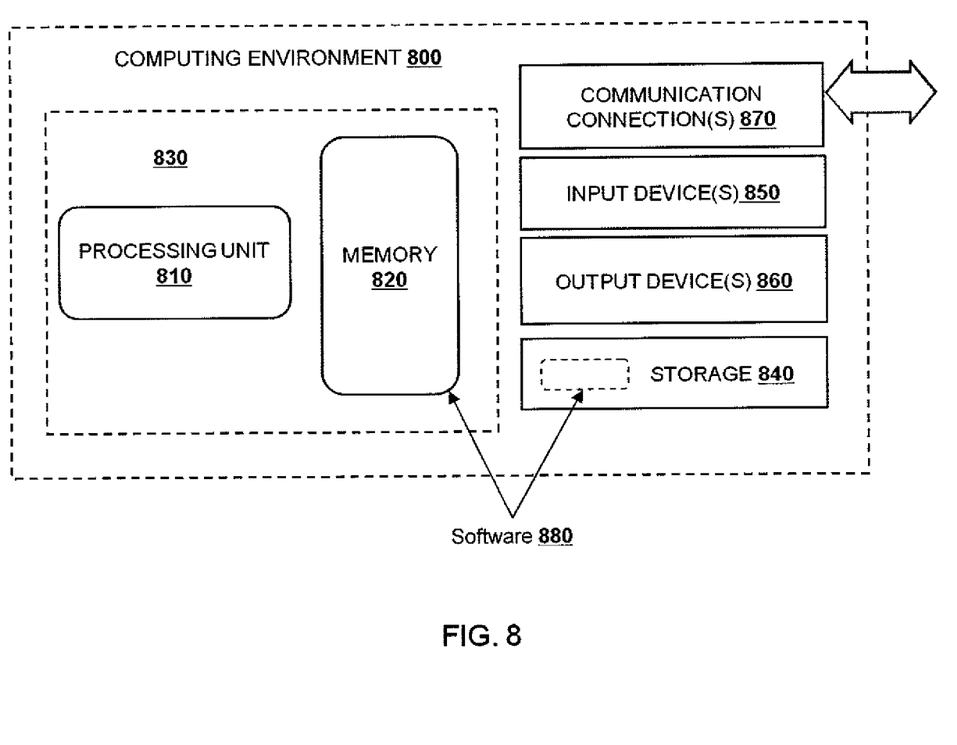
FIG. 8 is a system illustrating a generalized computer network arrangement, in one embodiment of the present technique.

One or more of the above-described techniques can be implemented in or involve one or more computer systems. FIG. 8 illustrates a generalized example of a computing environment 800. The computing environment 800 is not intended to suggest any limitation as to scope of use or functionality of described embodiments.

With reference to FIG. 8, the computing environment 800 includes at least one processing unit 810 and memory 820. In FIG. 8, this most basic configuration 830 is included within a dashed line. The processing unit 810 executes computer-executable instructions and may be a real or a virtual processor. In a multi-processing system, multiple processing units execute computer-executable instructions to increase processing power. The memory 820 may be volatile memory (e.g., registers, cache, RAM), non-volatile memory (e.g., ROM, EEPROM, flash memory, etc.), or some combination of the two. In some embodiments, the memory 820 stores software 880 implementing described techniques.

A computing environment may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other medium which can be used to store information and which can be accessed within the computing environment 800. In some embodiments, the storage 840 stores instructions for the software 880.

The input device(s) 850 may be a touch input device such as a keyboard, mouse, pen, trackball, touch screen, or game controller, a voice input device, a scanning device, a digital camera, or another device that provides input to the computing environment 800. The output device(s) 860 may be a display, printer, speaker, or another device that provides output from the computing environment 800.

The communication connection(s) 870 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 800, computer-readable media include memory 820, storage 840, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A computer implemented method to validate authenticity of identity claims of one or more communicating entities in an online transaction over a network via a processor configured to execute program instructions stored in a memory, the method comprising:
   registering identity information of a plurality of entities in a registry and associating each identity information with a unique resource name, wherein the registry is a web application, a web service, and a smart card;
   resolving any inconsistency in the registered identity information of the entities by eliminating duplicate identity information and identity information naming conflicts;
   initiating communication with a first entity during an online transaction, by a second entity;
   extracting identity information of the first entity during the initiated communication with the first entity;
   prompting the second entity to provide a unique resource name corresponding to the first entity, by a client agent;
   validating the identity information of the first entity using corresponding registered identity information within the registry for the unique resource name provided by the second entity; and
   determining the authenticity of the identity claims of the first entity, initiated during the communication with the second entity based on the validation.

2. The method as recited in claim 1, wherein the first entity is at least one of a web server, a web application and a remote procedure.

3. The method as recited in claim 1, wherein the second entity is at least one of a client device and a client application.

4. The method as recited in claim 1, wherein the identity information comprises a digital certificate of the first entity.

5. The method as recited in claim 1, wherein the registered identity information within the registry comprises a digital certificate of the first entity.

6. The method as recited in claim 1, wherein the network is a secure network using a secured transport layer protocol.

7. The method as recited in claim 1, wherein the unique resource name comprises at least one of a domain name and an alias name.

8. The method as recited in claim 1, wherein the step of validating the identity information comprises comparing the identity information with the registered identity information.

9. The method as recited in claim 1, further comprising allowing the second entity to continue the initiated communication with the first entity when the identity information of the first entity is found registered within the registry.

10. The method as recited in claim 1, further comprising denying the second entity from continuing the initiated communication with the first entity when the identity information of the first entity is not found registered within the registry.

11. The method as recited in claim 1, further comprising indicating to the second entity when the identity information of the first entity has not been registered within the registry.

12. The method as recited in claim 1, further comprising notifying the second entity about a malicious resource based on the validation.

13. The method as recited in claim 1, wherein providing the unique resource name comprises at least one of inputting the unique resource name and selecting the unique resource name from a list.

14. The method as recited in claim 1, wherein the communication is initiated by the second entity using at least one of an internet browser, an advertising link, an e-mail link, and a discussion forum link.

15. A computer implemented method for registering identity information of a plurality of entities in a registry, via a processor configured to execute program instructions stored in a memory, the method comprising:
  receiving identity information of the plurality of entities from a network based resource;
  determining inconsistency by comparing the identity information with registered identity information in the registry, wherein the registry is a web application, a web service, and a smart card;
  resolving any inconsistency in the registered identity information of the entities by eliminating duplicate identity information and identity information naming conflicts;
  registering the identity information of the plurality of entities within the registry by associating the identity information with a corresponding unique resource name; and
  allowing communication between the plurality of entities based on validation of authenticity of identity information of the plurality of entities, the validation of authenticity of identity information comprising:
    initiating communication with a first entity during an online transaction, by a second entity;
    extracting identity information of the first entity during the initiated communication with the first entity;
    prompting the second entity to provide a unique resource name corresponding to the first entity, by a client agent;
    validating the identity information of the first entity using corresponding registered identity information within the registry for the unique resource name provided by the second entity; and
    determining the authenticity of the identity claims of the first entity, initiated during the communication with the second entity based on the validation.

16. The method as recited in claim 15, wherein the network based resource comprises at least one of an internet based application, an intranet based application, and an offline based application.

17. The method as recited in claim 15, wherein the unique resource name is provided by at least one of a second entity and a first entity.

18. The method as recited in claim 15, wherein the inconsistency of the identity information comprises at least one of duplication and identity information naming conflicts.

19. A system for authenticating identity claims of one or more communicating entities in an online transaction over a network via a processor configured to execute program instructions stored in a memory, the system comprising:
  a registry module for registering identity information of a plurality of entities in a registry and associating each identity information with a unique resource name, wherein the registry is a web application, a web service, and a smart card;
  a resolution module for resolving any inconsistency in the registered identity information of the entities by eliminating duplicate identity information and identity information naming conflicts;
  a client application module initiating communication with a first entity during an online transaction, by a second entity; and
  a client agent module, intercepting a response from the first entity, wherein the client agent module comprises:
    an extraction module, extracting identity information of the first entity during the initiated communication;
    a pop-up module, prompting the second entity to input a unique resource name corresponding to the first entity; and
    a validation module, validating the identity information of the first entity using registered identity information within the registry module corresponding to the unique resource name provided by the second entity, and determining the authenticity of the identity claims of the first entity, initiated during the communication with the second entity based on the validation.

20. The system as recited in claim 19, wherein the client agent module is an intelligent agent that validates the authenticity of the identity claims of the one or more communicating entities.

21. The system as recited in claim 19, wherein the registry module is a repository storing identity information of the plurality of entities mapped to the respective unique resource name of each of the plurality of entities.

22. The system as recited in claim 19, wherein the registry module is at least one of an online application and an offline application.

23. The system as recited in claim 19, wherein the client application module is invoked using at least one of an internet browser, an advertising link, an email link, and a discussion forum link.

24. The system as recited in claim 19, wherein the client agent module intercepts the communication initiated by the second entity.

25. The system as recited in claim 19, wherein the client agent module is configured within a client device to communicate with the first entity.

26. The system as recited in claim 25, wherein the client device is at least one of a mobile phone, a desktop computer, a laptop, and a personal digital assistant (PDA).

27. The system as recited in claim 19, wherein the validation module further comprises a mapping module to fetch the registered identity information of the first entity within the registry module based on the unique resource name of the first entity.

28. The system as recited in claim 27, wherein the validation module further comprises a comparison module for comparing the identity information of the first entity with the registered identity information fetched from the registry module.

29. The system as recited in claim 28, wherein the comparison module allows the second entity to continue the initiated communication with the first entity when the identity information of the first entity is found registered within the registry module.

30. The system as recited in claim 28, wherein the comparison module denies the second entity from continuing the initiated communication with the first entity when the identity information of the first entity is not found registered within the registry module.

31. The system as recited in claim 19, wherein the client agent module further transfers at least one of the identity information and the unique resource name to a registry mapping module to fetch the registered identity information from the registry module for validation.

32. The system as recited in claim 19, wherein the registry module further comprises a registry comparison module for comparing the registered identity information obtained from the registry module with the identity information transferred from the client agent module corresponding to the unique resource name.

33. The system as recited in claim 19, wherein the client agent module denies communication with first entity when the identity information of the first entity is not found registered within the registry module.

34. A system for registering identity information of a plurality of entities via a processor configured to execute program instructions stored in a memory, the system comprising:
   a registry module, receiving the identity information of at least one of the plurality of entities from a network based resource and storing in a registry, wherein the registry is a web application, a web service, and a smart card;
   a discrepancy module, checking inconsistency in the identity information of the at least one of the plurality of entities, wherein the identity information is compared with registered identity information in the registry module;
   a resolution module for resolving any inconsistency in the registered identity information of the entities by eliminating duplicate identity information and identity information naming conflicts; and
   a linking module that:
      associates a unique resource name with the identity information; and
      registers the identity information in the registry module for allowing communication between the plurality of entities based on validation of authenticity of identity information of the plurality of entities, wherein the validation of authenticity of identity information is via:
         a client application module that initiates communication with a first entity during an online transaction, by a second entity; and
         a client agent module that intercepts a response from the first entity, wherein the client agent module comprises:
            an extraction module that extracts identity information of the first entity during the initiated communication;
            a pop-up module that prompts the second entity to input a unique resource name corresponding to the first entity; and
            a validation module that validates the identity information of the first entity using registered identity information within the registry module corresponding to the unique resource name provided by the second entity, and determines the authenticity of the identity claims of the first entity, initiated during the communication with the second entity based on the validation.

35. The system as recited in claim 34, wherein the linking module receives the unique resource name from at least one of a second entity and a first entity before associating the unique resource name with the identity information.

36. The system as recited in claim 34, wherein the registry module registers the identity information through at least one of an online registration process and an offline registration process.

37. A computer program product comprising a non-transitory computer usable medium having a computer readable program code embodied therein for validating authenticity of identity claims of one or more communicating entities in an online transaction over a network, the computer program product comprising: a program code adapted for:
   registering identity information of a plurality of entities in a registry and associating each identity information with a unique resource name, wherein the registry is a web application, a web service, and a smart card;
   resolving any inconsistency in the registered identity information of the entities by eliminating duplicate identity information and identity information naming conflicts;
   initiating communication with a first entity during an online transaction, by a second entity;
   extracting identity information of the first entity during the initiated communication with the first entity;
   prompting the second entity to provide a unique resource name corresponding to the first entity, by a client agent;
   validating the identity information of the first entity using corresponding registered identity information within the registry for the unique resource name provided by the second entity; and
   determining the authenticity of the identity claims of the first entity, initiated during the communication, with the second entity based on the validation.

38. A computer program product comprising a non-transitory computer usable medium having a computer readable program code embodied therein for registration of one or more identity information of a plurality of entities in a registry, the computer program product comprising:
   a program code adapted for:
      receiving identity information of the plurality of entities from a network based resource;
      determining inconsistency by comparing the identity information with registered identity information in the registry, wherein the registry is a web application, a web service, and a smart card;
      resolving any inconsistency in the registered identity information of the entities by eliminating duplicate identity information and identity information naming conflicts;
      registering the identity information of the plurality of entities, within the registry, by associating the identity information with a corresponding unique resource name; and
      allowing communication between the plurality of entities based on validation of authenticity of identity information of the plurality of entities, the validation of authenticity of identity information comprising:
         initiating communication with a first entity during an online transaction, by a second entity;
         extracting identity information of the first entity during the initiated communication with the first entity;
         prompting the second entity to provide a unique resource name corresponding to the first entity, by a client agent;
         validating the identity information of the first entity using corresponding registered identity information within the registry for the unique resource name provided by the second entity; and determining the authenticity of the identity claims of the first entity, initiated during the communication with the second entity based on the validation.

* * * * *